(12) United States Patent
Bueno

(10) Patent No.: US 10,883,358 B2
(45) Date of Patent: Jan. 5, 2021

(54) INSERTION TOOL FOR INSPECTION OF VESSEL

(71) Applicant: GE Inspection Technologies, LP, Lewistown, PA (US)

(72) Inventor: Manuel Kenneth Bueno, Syracuse, NY (US)

(73) Assignee: GE INSPECTION TECHNOLOGIES, LP, Lewistown, PA (US)

( * ) Notice: Subject to any disclaimer, the term of this patent is extended or adjusted under 35 U.S.C. 154(b) by 0 days.

(21) Appl. No.: 16/383,040

(22) Filed: Apr. 12, 2019

(65) Prior Publication Data

US 2019/0316458 A1 Oct. 17, 2019

Related U.S. Application Data

(60) Provisional application No. 62/657,355, filed on Apr. 13, 2018.

(51) Int. Cl.
*E21B 47/002* (2012.01)
*G03B 37/00* (2006.01)
(52) U.S. Cl.
CPC .......... *E21B 47/002* (2020.05); *G03B 37/005* (2013.01)
(58) Field of Classification Search
CPC ... E21B 47/0002; G03B 37/005; G03B 37/02; F21W 2131/411; G01N 21/954; G01N 21/9542; G01N 21/9548; H04N 2005/2255; H04N 5/23299; H04N 5/2253; H04N 5/247; A61B 1/045; A61B 1/0011; A61B 1/00147; A61B 1/00177; A61B 1/042; A61B 1/0646; A61B 1/00; A61B 1/00052
See application file for complete search history.

(56) References Cited

U.S. PATENT DOCUMENTS

| | | | |
|---|---|---|---|
| 5,253,321 A | 10/1993 | Long et al. | |
| 5,604,532 A * | 2/1997 | Tillmanns | G01N 21/954 348/83 |
| 5,770,809 A * | 6/1998 | Waterman | G01N 17/046 73/866.5 |
| 2016/0070038 A1* | 3/2016 | Peyman | G02B 3/14 359/666 |
| 2016/0330351 A1* | 11/2016 | DeAscanis | G02B 23/2484 |
| 2016/0373624 A1* | 12/2016 | Imai | A61B 1/015 |
| 2018/0243004 A1* | 8/2018 | Von Segesser | A61M 25/0662 |

* cited by examiner

*Primary Examiner* — Alexander Gee
(74) *Attorney, Agent, or Firm* — Mintz Levin Cohn Ferris Glovsky and Popeo, P.C.

(57) ABSTRACT

An insertion tool can include: a housing having proximal and distal ends with a sealed chamber therebetween, the distal end having a flange configured to engage with a flange of a valve assembly coupled to a pressurized vessel to allow the sealed chamber to fluidly communicate with the pressurized vessel; a hollow inner shaft slidably disposed through a proximal opening in the proximal end of the housing, through the sealed chamber, and through a distal opening in the distal end of the housing such that the inner shaft is operable to be advanced distally into the valve assembly toward an interior portion of the pressurized vessel, the inner shaft having an inner lumen that is sealed from the sealed chamber of the outer housing and that is configured to receive an inspection tool therein; and an optically transparent member disposed at a distal end of the inner shaft.

19 Claims, 13 Drawing Sheets

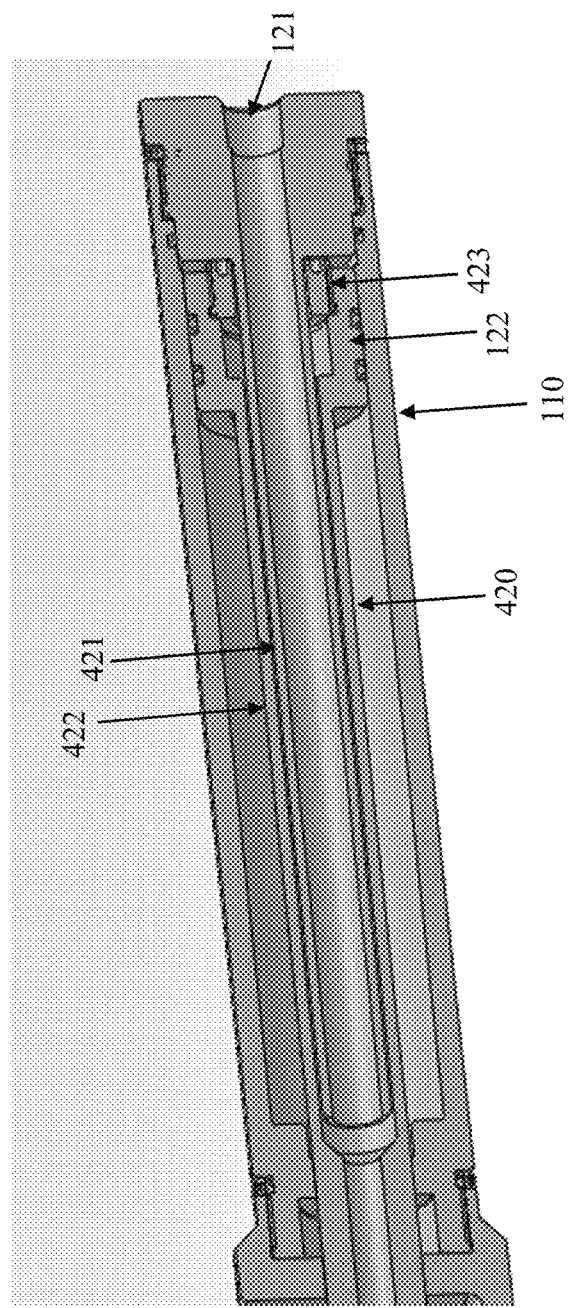

INSERTION TOOL FOR INSPECTION OF VESSEL

CROSS-REFERENCE TO RELATED APPLICATION

This application claims the benefit of priority to U.S. Provisional Patent Application No. 62/657,355, filed on Apr. 13, 2018 in the U.S. Patent and Trademark Office, the entire disclosure of which is incorporated herein by reference.

FIELD

Vessel inspections devices and methods are provided for inspection of a vessel.

BACKGROUND

The integrity of a vessel can be evaluated using visual inspection techniques through the use of instruments such as borescopes, periscopic cameras, fiberscopes, and the like. Inspections may be used to verify that a vessel is operating properly, for example, for the purpose of preventative maintenance. Inspections can also be used when conducting vessel repairs, to identify defects like cracks, clogs, corrosion, or stripped threads, or to determine the location of valves and fittings for carrying out a repair. Moreover, visual inspections of vessels can sometimes be performed in response to emergency situations, e.g., a leak, where time is of the essence. In some of these scenarios, inspections need not only be accurate, but also quickly performed.

As an example, hydrocarbon extraction systems can utilize a series of vessels, e.g., pipelines or other tubular members, which convey various fluids between components. These components can be coupled to one another using flange connections which are subjected to various loads and environmental conditions during operation of the hydrocarbon extraction system. The conveyed fluids can be pressurized relative to the external environment of the components or other tubular members. For this reason, when inspections are needed, vessels carrying the pressurized fluids can be required to be depressurized to allow for insertion of the inspection tool. Depressurizing the inspection area, and subsequently repressurizing the area, however, can produce undesirable downtime of the system. In other cases, the inspection tool must be pressure-rated to comply with the pressurized vessel. But such tools can be more costly and less prevalent than regular borescopes or other camera-based viewing systems rated for atmospheric conditions.

Accordingly, there remains a need for improved methods and devices for inspection a pressurized vessel.

SUMMARY

During inspection of a vessel, depressurizing the inspection area, and subsequently repressurizing the area, however, can produce undesirable downtime of the system. In other cases, the inspection tool must be pressure-rated to comply with the pressurized vessel. But such tools can be more costly and less prevalent than regular borescopes or other camera-based viewing systems rated for atmospheric conditions. Accordingly, there remains a need for improved methods and devices for inspection a pressurized vessel.

Vessel inspections devices and methods are provided for inspection of a vessel. Methods and devices are provided for interfacing with a high-pressure vessel to provide external access to said vessel for visual inspection. In one embodiment, an insertion tool is provided having a sealed chamber that can engage with and seal a valve assembly of a high-pressure vessel such that, upon opening the valve assembly, the vessel is not depressurized. In certain embodiments, the insertion tool can include a hollow inner shaft traversing an interior of the sealed chamber. When the sealed chamber is engaged with the valve assembly, and the valve assembly is opened, the inner shaft can be slid into the valve assembly toward the interior of the vessel. A distal end of the inner shaft can include a portion that is optically transparent. Therefore, upon inserting an inspection tool, e.g., a borescope, a periscopic camera, a fiberscope, etc., into the hollow inner shaft, and sliding the inner shaft distally toward the vessel, the inspection tool can acquire an image of the interior of the vessel through the optically transparent portion without depressurization of the high-pressure vessel, thus reducing time and effort needed to perform a visual inspection of a pressurized vessel.

In certain exemplary embodiments, the tool can include an outer housing having proximal and distal ends with a sealed chamber therebetween. The distal end can have a flange that is configured to engage with a flange of a valve assembly coupled to a pressurized vessel to allow the sealed chamber to fluidly communicate with the pressurized vessel. A hollow inner shaft can be slidably disposed through a proximal opening in the proximal end of the housing, through the sealed chamber, and through a distal opening in the distal end of the housing such that the inner shaft is operable to be advanced distally into the valve assembly toward an interior portion of the pressurized vessel. The inner shaft can have an inner lumen that is sealed from the sealed chamber of the outer housing and that is configured to receive an inspection tool therein. The hollow inner shaft can also have at least one optically transparent window for allowing viewing therethrough by the inspection tool.

In use, the inner shaft can be configured to receive an inspection tool, and the optically transparent member can enable an image acquisition means of the inspection tool to acquire an image of the interior portion of the pressurized vessel through the optically transparent member without depressurizing the pressurized vessel.

In some embodiments, the inner shaft can be configured to translate between a retracted position, in which the inner shaft is proximally positioned with respect to the housing, and an extended position, in which the inner shaft is distally positioned with respect to the housing. Moreover, when the insertion tool is coupled to the pressurized vessel, the optically transparent window can be positioned outside of the pressurized vessel when the inner shaft is in the retracted position, and the optically transparent window can be positioned inside at least a portion of the pressurized vessel when the inner shaft is in the extended position.

In some embodiments, a length of the inner shaft can be greater than a length of the housing. Moreover, wherein the housing and the inner shaft can be cylindrically shaped, respectively.

In some embodiments, the inner lumen of the inner shaft can be depressurized so as to accept therein inspection tools rated for depressurized environments. Moreover, a pressure level inside of the inner shaft can be different than a pressure level inside of the pressurized vessel.

In some embodiments, the optically transparent member can include an optically transparent member housing and one or more optically transparent portions disposed in the optically transparent member housing. Moreover, when the inspection tool is inserted into the inner shaft, and the inner shaft is advanced distally into the valve assembly toward the interior portion of the pressurized vessel, the one or more optically transparent portions of the optically transparent member can be configured to enable an image acquisition means of the inspection tool to acquire an image of the interior portion of the pressurized vessel though the one or more optically transparent portions. Moreover, the one or more optically transparent portions can be disposed in the optically transparent member housing so as to allow for a 360-degree field of view during inspection of the interior portion of the pressurized vessel.

In some embodiments, the insertion tool can further include a piston coupled to the inner shaft, the piston configured to drive the inner shaft distally or proximally. The piston can be disposed on an outer circumference of the inner shaft so as to form a seal with an inner wall of the housing.

In some embodiments, the inner shaft can be driven distally or proximally using pneumatic means, hydraulic means, or electric means.

In some embodiments, the inner shaft can include one or more concentric telescoping inner shaft members. Moreover, the inner shaft can be proximally mounted to the housing. When the insertion tool is coupled to the pressurized vessel, the one or more telescoping inner shaft members can be configured to extend distally toward the interior portion of the pressurized vessel. Thus, the one or more telescoping inner shaft members can be configured to extend distally toward the interior portion of the pressurized vessel while the inner shaft remains in a fixed position. Moreover, the inner shaft can include an inner shaft member proximally mounted to the housing and an outer shaft member configured to extend distally toward the interior portion of the pressurized vessel when the insertion tool is coupled to the pressurized vessel. An outer diameter of the outer shaft member can be greater than an outer diameter of the inner shaft member.

In some embodiments, the insertion tool can further include a proximal housing seal disposed at a proximal opening of the housing and a distal housing seal disposed at a distal opening of the housing.

In some embodiments, the insertion tool can further include an optically transparent member seal disposed at a proximal or distal end of the optically transparent member.

In some embodiments, a flange gasket disposed adjacent to the flange of the housing.

In certain exemplary embodiments, the inspection tool can be operated by attaching a flange disposed at the distal end of the housing to a flange of a valve assembly coupled to a pressurized vessel; opening a gate valve of the valve assembly such that the sealed chamber is in fluid communication with the pressurized vessel; advancing distally the inner shaft through the gate valve and into the valve assembly toward an interior portion of the pressurized vessel; and receiving an inspection tool in the inner lumen of the inner shaft. A portion of the optically transparent member can be optically transparent to allow viewing therethrough by the inspection tool.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 9A and 9B include cross-sectional side views of a telescoping inner shaft, according to a first embodiment, for use in the insertion tool of FIG. 1.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION

Pipes that contain fluid or gas under high pressure can be regularly inspected to check that there is no damage or defects that could result in a leak. Most pipes can be formed of multiple segments that are connected at joints or flanges that contain a valve assembly. Current inspection techniques can require the pipe segment to be closed off using the valves and depressurized so as to avoid damaging the inspection tool. However, depressurizing the inspection area, and subsequently repressurizing the area, can produce undesirable downtime of the system.

Accordingly, an insertion tool is provided that can couple to a flange on a pressurized pipe, and that allows an inspection tool to be advanced through the valve assembly without the need to depressurize the pipe. In particular, the insertion tool includes a sealed chamber that can couple to the pressurize pipe, and a hollow inner shaft that can slide within the sealed chamber. The hollow inner shaft can be configured to receive an existing inspection tool. Also, the hollow inner shaft can have a transparent end for allowing viewing therethrough. The hollow inner shaft can thus function to protect the inspection tool from the pressure within the pipe. As such, regular borescopes or other camera-based viewing systems rated for atmospheric conditions can be used.

Embodiments of an insertion tool for inspection of a vessel are discussed herein below.

Figure 1:
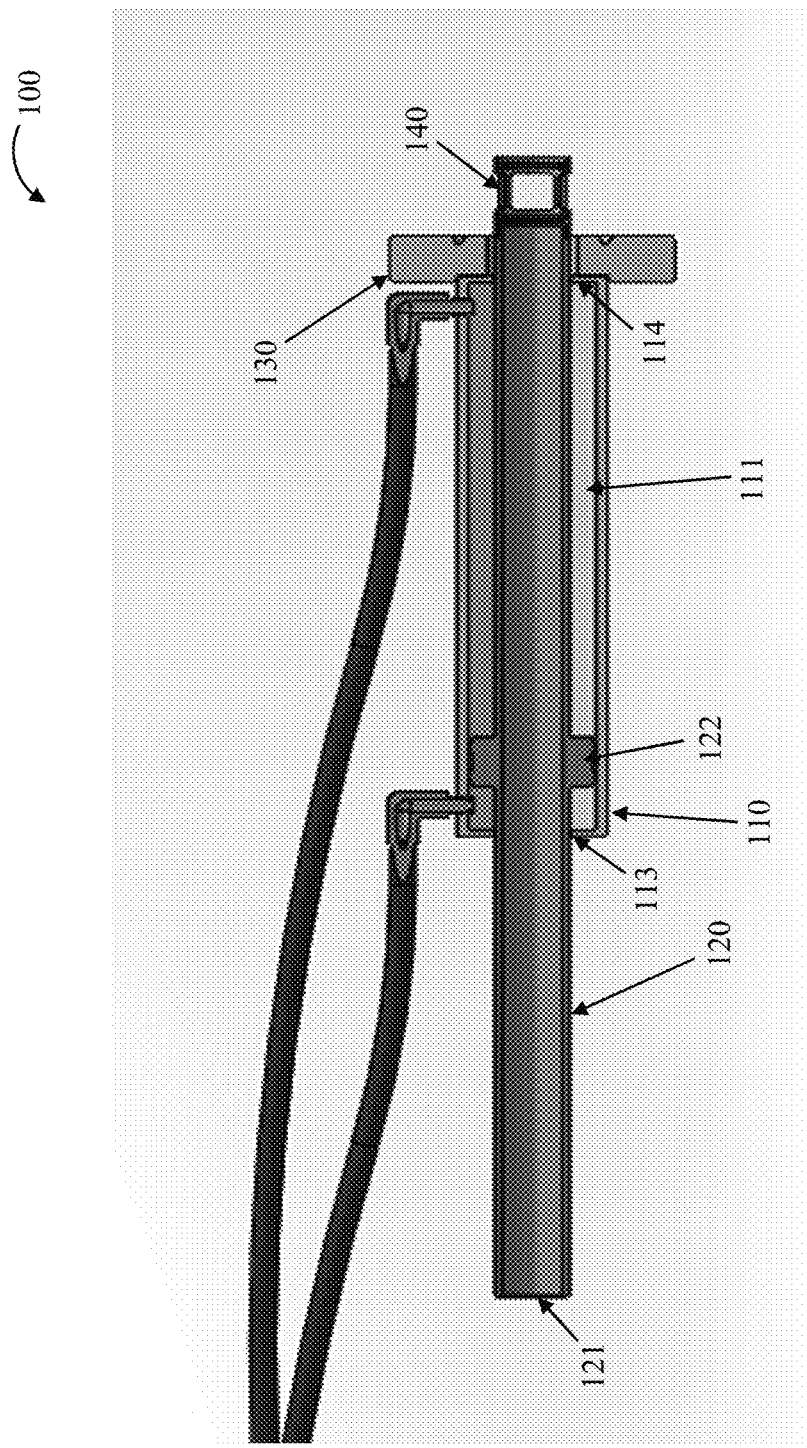
FIG. 1 is a cross-sectional side view of an insertion tool.

FIG. 1 illustrates one embodiment of an insertion tool 100 that enables external access to a vessel 200 under pressure for performing a visual inspection. As shown, the insertion tool 100 generally includes a housing 110 having proximal and distal ends with a sealed chamber 111 therebetween. The distal end of the housing 110 can include a flange 130 disposed thereon that is configured to engage with a flange 230 of a valve assembly 210 on a pressurized vessel 200. When the flange 130 of the insertion tool 100 is mated with the flange 230 of the valve assembly 210, and the valve assembly 210 is opened, the sealed chamber 111 can fluidly communicate with the pressurized vessel 200. As a result, the sealed chamber 111 can have a pressure that corresponds to a pressure of the vessel 200.

Figure 7:
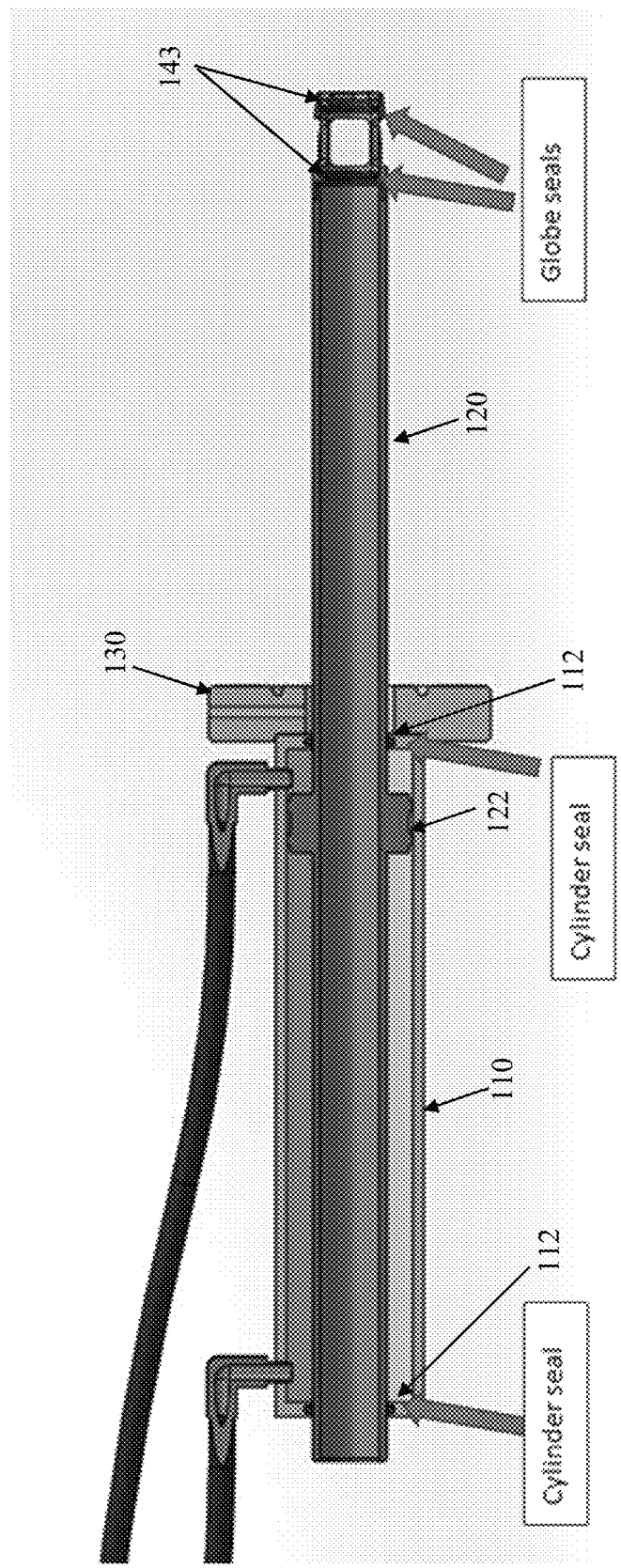
FIG. 7 is a cross-sectional side view of the insertion tool of FIG. 1 and sealing members disposed therein.

The housing 110 can have various shapes and sizes, but in an exemplary embodiment, is in the form of an elongate hollow cylinder. The proximal and distal ends of the housing 110 can include cylinder seals or gaskets 112 to ensure the chamber 111 is fully sealed, as shown in FIG. 7, for example. The insertion tool 100 can further include a hollow inner shaft 120 disposed within the housing 110, as mentioned above. The inner shaft 120 can have a length that is greater than a length of the housing 110, and it can be slidably disposed through a proximal opening 113 in the proximal end of the housing 110, through the sealed chamber 111, and through a distal opening 114 in the distal end of the housing 110. As such, the inner shaft 120 can be advanced distally into the valve assembly 210 toward an interior portion of the pressurized vessel 200, as shown in greater detail in FIGS. 3A and 3B. The inner shaft 120 can have an opening 121 at the proximal end thereof that is positioned proximal of the proximal end of the housing 110, thus allowing for insertion of an inspection tool 300, such as a borescope, periscopic camera, fiberscope, or the like.

The insertion tool 100 can further include an optically transparent member 140 disposed on the distal end of the inner shaft 120. As such, at least a portion of the distal end of the inner shaft 120 can be optically transparent. When an inspection tool 300, such as those listed above, is inserted distally in the inner shaft 120, the optically transparent member 140 can enable an image acquisition means (e.g., a camera or the like) of the inspection tool 300 to acquire an image of an interior portion of the pressurized vessel 200 through the optically transparent member 140.

Figure 2:
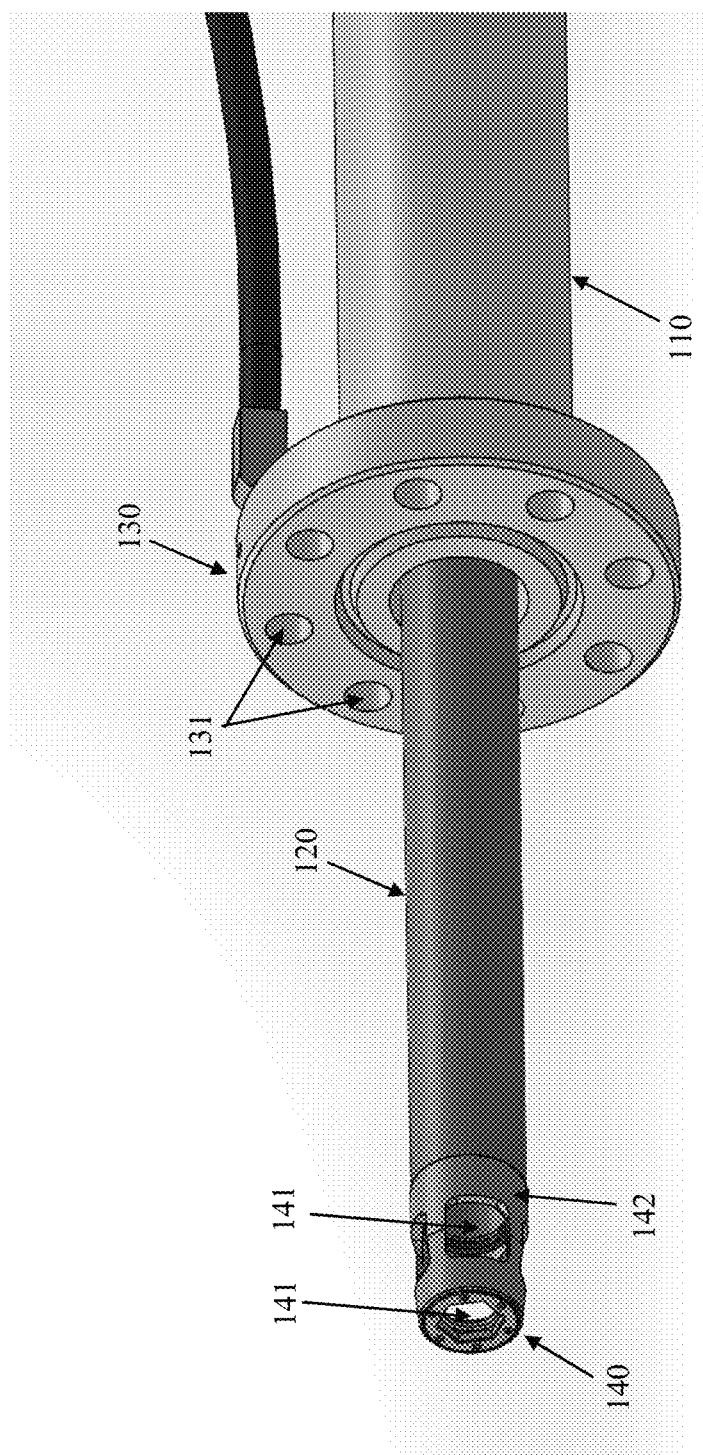
FIG. 2 is a perspective view of an inner shaft of the insertion tool of FIG. 1, shown extending outwardly from a sealed chamber.

FIG. 2 illustrates one embodiment of the distal end of the optically transparent member 140 in more detail, showing the member extending distally from the sealed chamber 111. As shown, the distal end generally includes one or more optically transparent portions 141, e.g., windows, also referred to as a "sight globe," rated for high-pressure environments, thus enabling the optically transparent member 140 to be exposed to the pressurized interior of the vessel 200 during performance of the visual inspection. The one or more optically transparent portions 141 can be disposed circumferentially around the optically transparent member 140 and/or disposed on a distal-facing end of the optically transparent member 140, allowing for a 360-degree field of view during inspection. The one or more optically transparent portions 141 can be welded or otherwise mounted to the inner shaft 120 and disposed in any suitable configuration on or around the distal end of the inner shaft 120, an example of which is demonstrated in FIG. 2, so as to allow for sufficient viewing of the interior of the vessel 200 using an inserted inspection tool 300.

In some cases, the optically transparent member 140 can include a housing or cage structure 142 with openings (i.e., windows) formed therein, and a cylinder made of glass or similar transparent material mounted within the housing 142. The housing 142 can be affixed to the distal end of the inner shaft 120. For instance, the housing 142 can include threads to mate with threads disposed on the distal end of the inner shaft 120, the housing 142 can be welded onto the distal end of the inner shaft 120, and so forth.

The optically transparent member 140 can be adequately sealed so as to maintain pressure chamber integrity within the vessel 200, and to maintain the non-pressurized environment within the inner shaft 120. Proximal and distal ends of the optically transparent member 140 can include seals or gaskets 143 to ensure the optically transparent member 140 is fully sealed, as shown in FIG. 7, for example. Maintaining a non-pressurized environment within the inner shaft 120 can allow for visual inspections of the high-pressure vessel 200 to be performed using a standard borescope, for example, even though the pressure level within the vessel 200 to be inspected exceeds the design limitations of said borescope.

Thus, the pressure level inside of the inner shaft 120 can differ from the pressure level inside of the vessel 200. In some cases, the pressure level inside of the inner shaft 120 can be less than the pressure level inside of the vessel 200. In other cases, the pressure level inside of the inner shaft 120 can be greater than the pressure level inside of the vessel 200, such as a vessel that is negatively pressurized, e.g., a vacuum chamber or cavity.

As further shown in FIG. 1, the inner shaft 120 can include a piston 122 coupled thereto and forming a seal with an inner wall of the outer housing 110. The piston 122 can be mechanically driven (e.g., using an assembly of gears or the like) to allow for translating the inner shaft 120 distally (toward the pressurized vessel 200) or proximally (away from the vessel 200), or, alternatively, the piston 122 may be pneumatically, hydraulically, or electrically driven. In some cases, the sealed chamber 111 can contain hydraulic fluid to assist in slidable movement of the inner shaft 120. Additionally, or alternatively, the inner shaft 120 can be advanced or retracted manually.

As further shown in FIG. 2, a flange 130 can be disposed at the distal end of the housing 110. The flange 130 can be configured to mate with an existing flange 230 of a valve assembly 210 coupled to a pressurized vessel 200. The flange 130 can be exemplarily designed as demonstrated in FIG. 2, but may be fashioned in various other suitable forms based on the desired compatibility of the insertion tool 100 with vessels to be inspected. In some cases, a plurality of holes 131 can be formed in the flange 130 so as to correspond with holes formed in the flange 230 of the valve assembly 210. Fasteners, such as bolts, pins, or the like, can be inserted through the holes of both flanges to attach the flanges to each other, thereby connecting the insertion tool 100 to the pressurized vessel 200. In some cases, an adapter (not shown) can be coupled to the flange 130 of the insertion tool 100 so as to match the design of the flange 230 of the valve assembly 210.

Figure 3A:
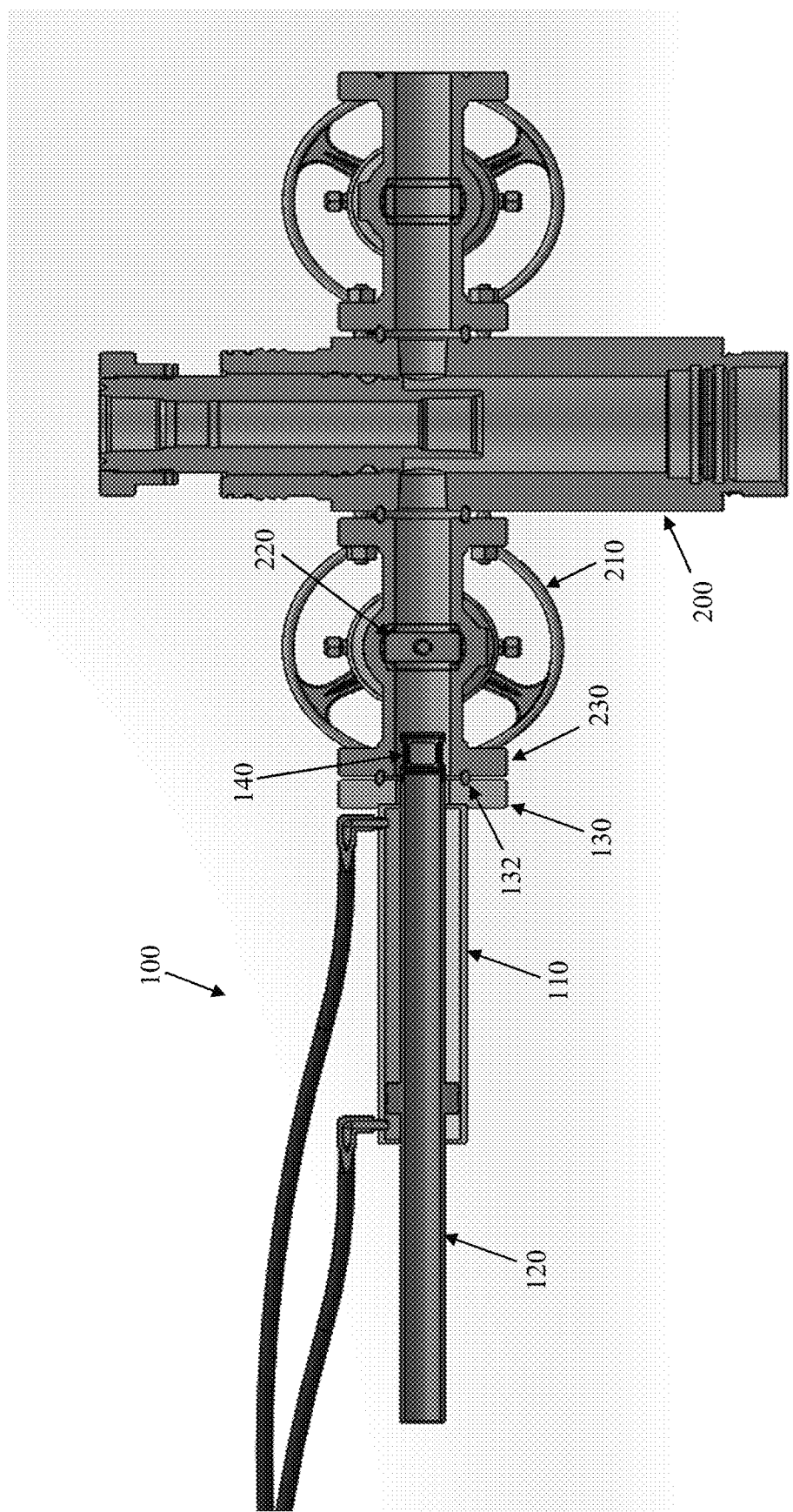
FIG. 3A is a cross-sectional side view of the insertion tool of FIG. 1 shown mated with a valve assembly of a pressurized vessel, showing the inner shaft in an initial position.
Figure 3B:
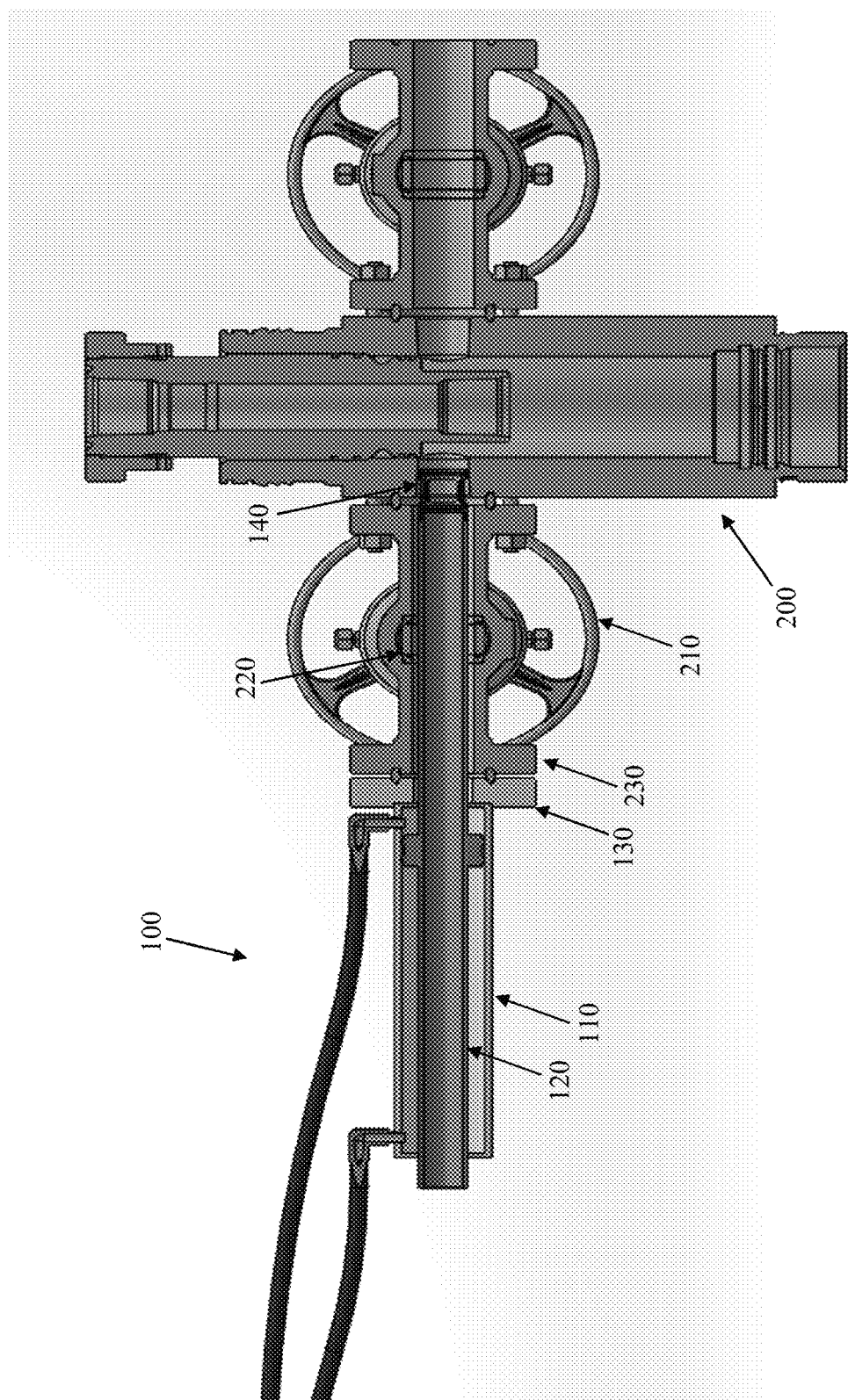
FIG. 3B is a cross-sectional side view of the insertion tool of FIG. 1 shown mated with a valve assembly of a pressurized vessel, showing the inner shaft in an advanced position.
Figure 8:
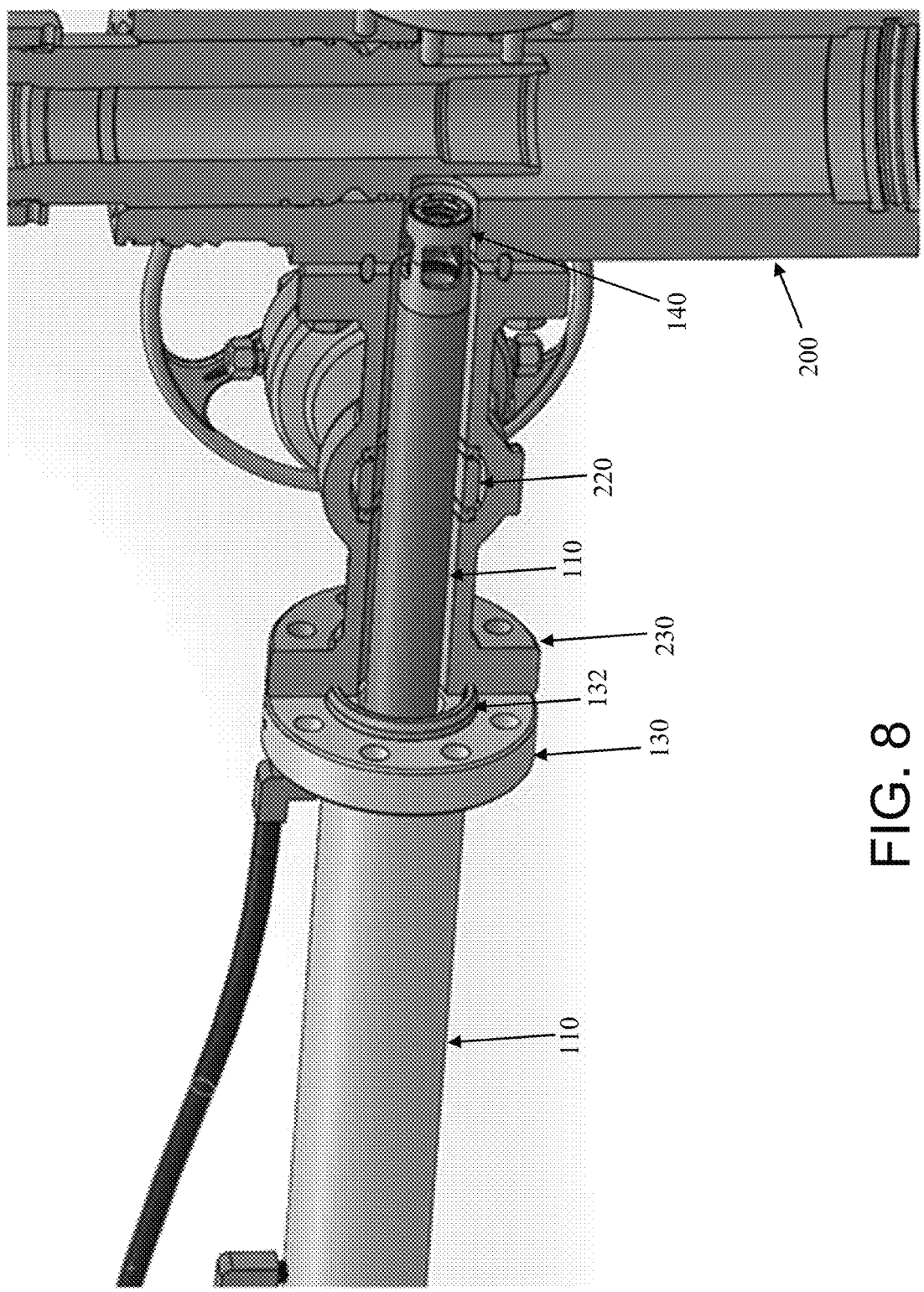
FIG. 8 is a perspective view of the insertion tool of FIG. 1 and a cross-sectional view of the valve assembly of the pressurized vessel of FIGS. 3A and 3B shown mated with the insertion tool.

FIGS. 3A and 3B illustrate one embodiment of the insertion tool 100 mated with a valve assembly 210 of a pressurized vessel 200. As shown, the flange 130 of the insertion tool 100 can mate with an existing flange 230 of a valve assembly 210 coupled to a pressurized vessel 200 so as to form a seal. In this regard, the housing 110 can be distally mounted (e.g., welded, threaded, etc.) to the flange 130 of the insertion tool 100. One or more gaskets 132 can be disposed at the region where the mated flange seal is formed (e.g., between the flanges) so as to prevent leakage from the vessel 200, as shown in FIG. 8, for example. In some cases, the one or more gaskets 132 disposed between the mating flanges can be a bolted seal gasket. Mating the flanges together can deform the one or more gaskets 132 therebetween, thereby creating a leak-proof seal.

As shown in FIG. 3A, the gate valve 220 of the valve assembly 210 coupled to the pressurized vessel 200 can be initially closed so as to prevent leakage of fluids and depressurizing the vessel 200. At this stage, pressure within the valve assembly 210 distal of the gate valve 220 can be equal to the high-pressure of the vessel 200, whereas the valve assembly 210 proximal of the gate valve 220 may be a depressurized area. Also, at this stage, the inner shaft 120 can be in a retracted position whereby the inner shaft 120 is proximally located with respect to the housing 110.

Figure 6:
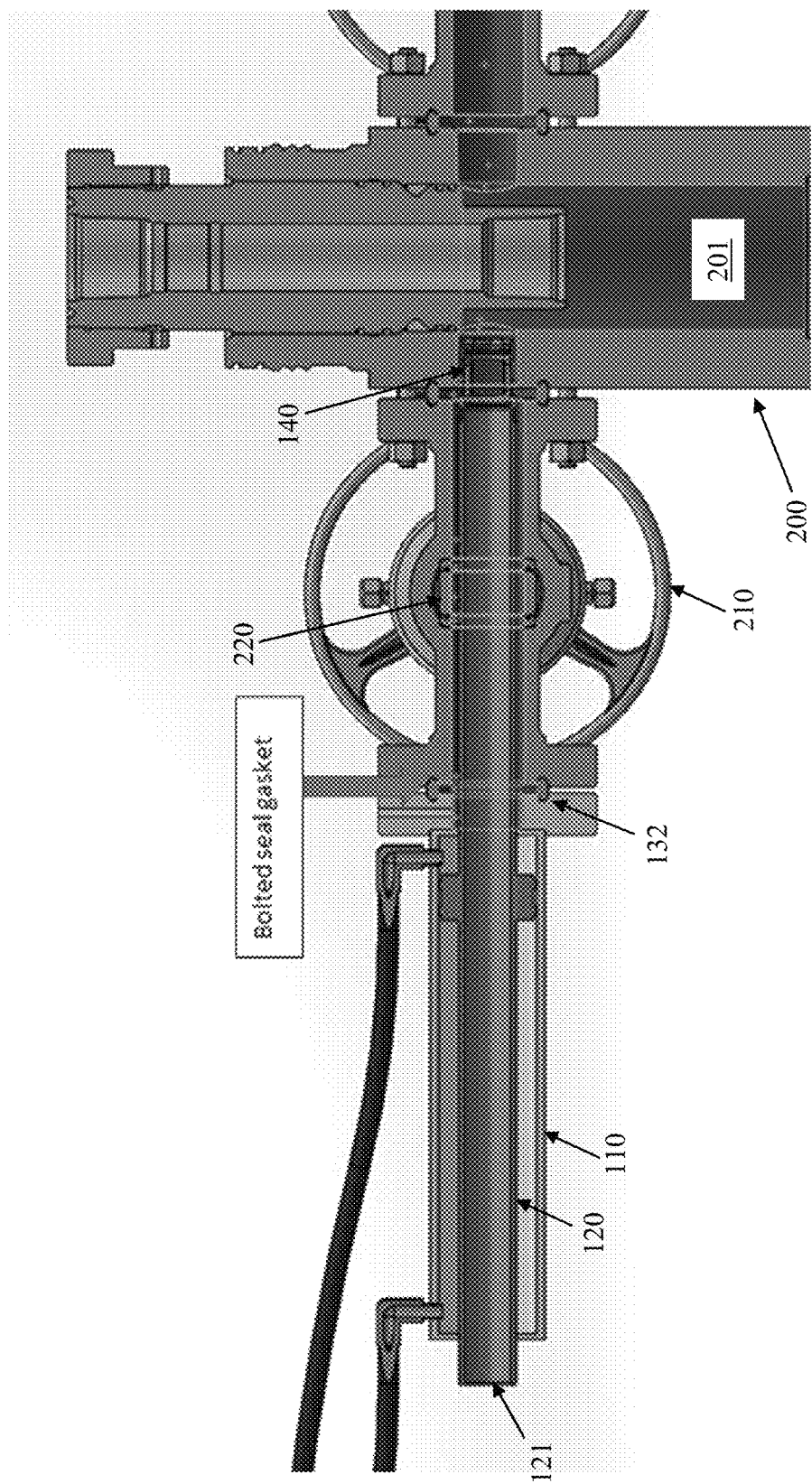
FIG. 6 is a cross-sectional side view of the insertion tool of FIG. 1 shown mated with a valve assembly of a pressurized vessel, showing a resulting pressurized area when the inner shaft is in the advanced position of FIG. 3B.

After the insertion tool 100 is mated to the valve assembly 210, the gate valve 220 of the valve assembly 210 can be opened, as shown in FIG. 3B. A pressure level inside the valve assembly 210 and surrounding the inner shaft 120 can be equalized to that of the high-pressure vessel 200. However, the seal formed between the mating flanges 130 and 230 can prevent pressurization of the sealed chamber 111. For example, as shown in FIG. 6, where the pressurized area 201 is represented as a shaded area, the pressurized area 201 can extend to the seal formed by the mating flanges 130 and 230 (and gasket(s) 132 therebetween) upon opening the valve assembly 210. If any pressurized air extends beyond the seal formed by the mating flanges 130 and 230, the distally located cylinder seal 112 of the sealed chamber 111 can prevent the chamber 111 from being pressurized. The interior of the inner shaft 120 can remain non-pressurized as the inner shaft 120 and optically transparent member 140 form a pressure barrier preventing the high pressure levels within the sealed chamber 111 and of the vessel 200 from affecting an interior of the inner shaft 120.

At this stage, the inner shaft 120 can be translated distally into the valve assembly 210, past the gate valve 220, and toward an area of interest within the pressurized vessel 200. In some cases, testing may be performed to ensure no leakage from the vessel 200 is occurring prior to advancing the inner shaft 120 through the valve assembly 210, using, e.g., a pressure gauge, a gas-sniffer probe, or the like.

Once the inner shaft 120 has extended into the vessel 200, as shown in FIG. 3B, the inner shaft 120 can be positioned such that the optically transparent member 140 is located in an inspection area within an interior of the pressurized vessel 200. For example, the inspection area of the pressurized vessel 200 can be internal threads for attaching a valve or the like, a vessel wall prone to cracking, an area susceptible to clogging, and so forth.

Figure 4:
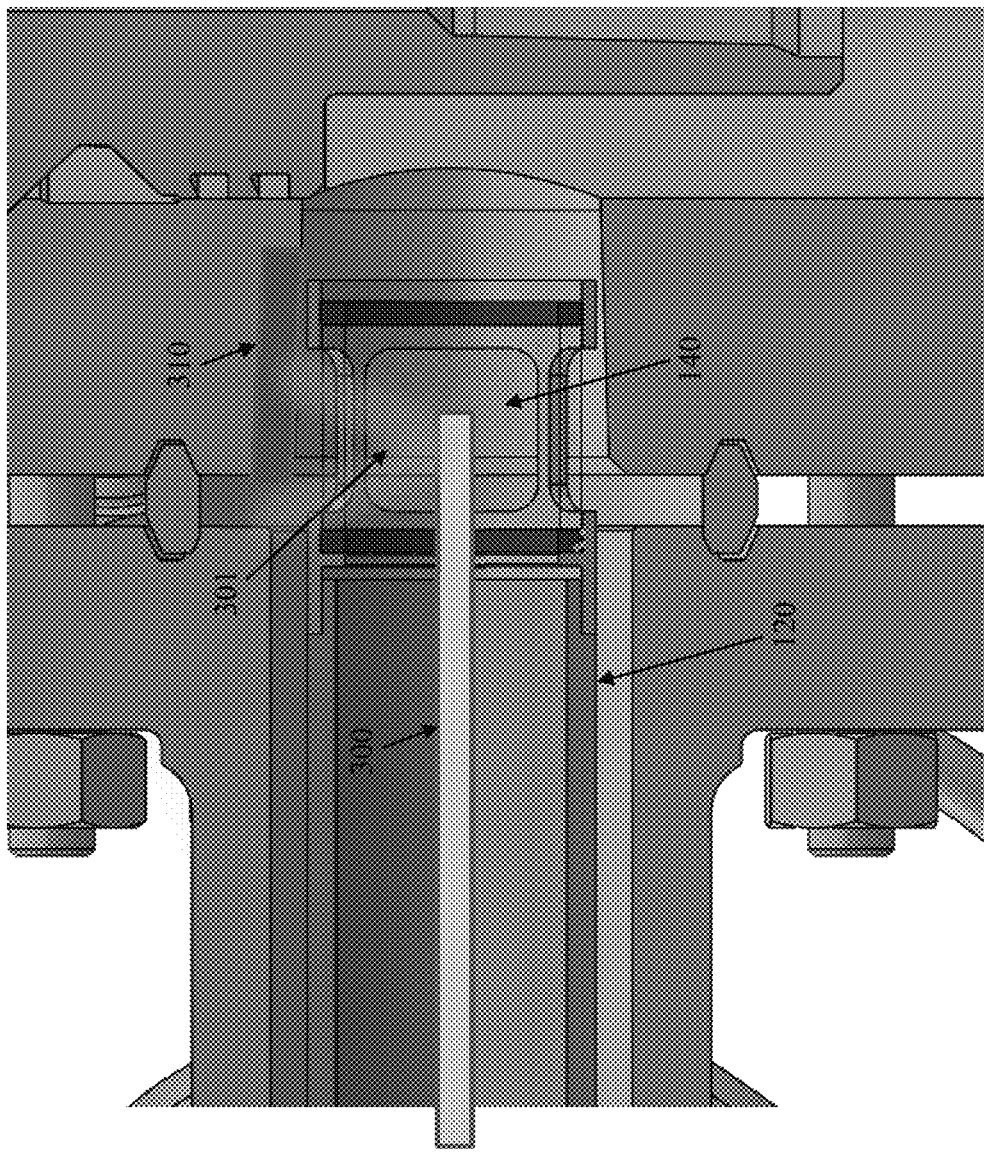
FIG. 4 is a cross-sectional side view of the inner shaft of the insertion tool extending into an interior of the pressurized vessel of FIGS. 3A and 3B, showing an inspection tool inserted into an interior of the inner shaft.

FIG. 4 illustrates one embodiment of an inner shaft 120 of the insertion tool 100 extended into the interior of the pressurized vessel 200 and an inspection tool 300 inserted into an interior of the inner shaft 120. As shown, the hollow inner shaft 120 can receive an inspection tool 300, such as a borescope, for conducting a visual inspection of the pressurized vessel 200. An image acquisition means (e.g., camera) of the inspection tool 300 can be positioned at the distal interior end of the inner shaft 120 so that the area for inspection 310 is within the sightline 301 of the image acquisition means. The optically transparent member 140 of the inner shaft 120 can be disposed therebetween so as to provide an unencumbered view of the area 310. That is, the inspection tool 300 inserted in the inner shaft 120 can perform the visual inspection of the vessel 200 through the optically transparent member 140.

As described above, the interior of the inner shaft 120 can be a non-pressurized environment, as compared to the high-pressure vessel 200 in which the distal end of the inner shaft 120 is located in FIG. 4. Therefore, the vessel 200 need not be depressurized, and inspection tools specially designed to withstand high-pressure environments are not necessary to perform the visual inspection within the high-pressure vessel 200. A wide range of visual inspection tools 300, including non-pressure-rated tools, can be utilized as they are protected from the high-pressure levels while disposed within the sealed inner shaft 120. Moreover, the non-pressurized environment of the interior of the inner shaft 120 can prevent the inspection tool 130 from being forcibly ejected from the vessel 200 during inspection.

Figure 5:
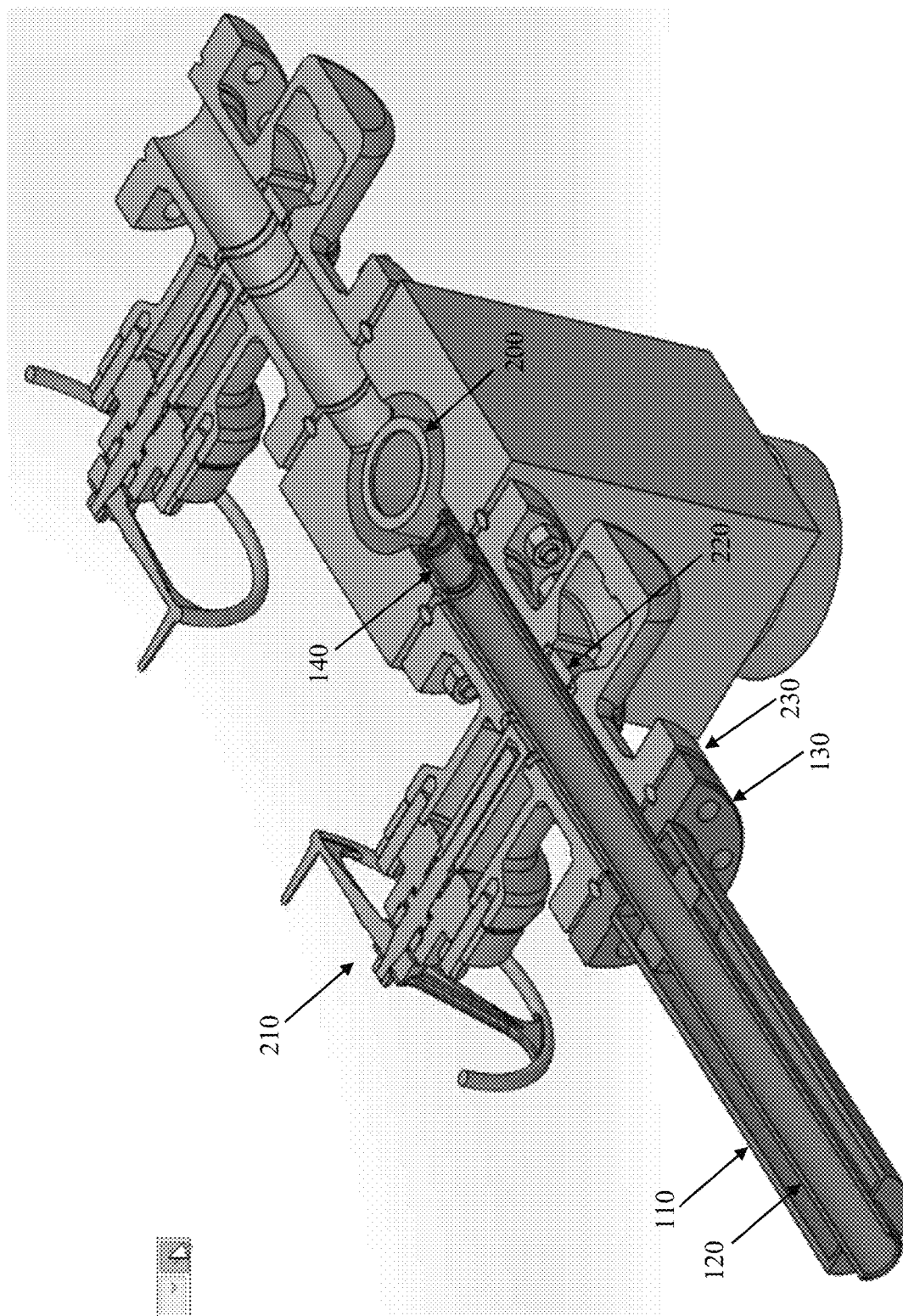
FIG. 5 is a top cross-sectional perspective view of the insertion tool mated with a valve assembly of a pressurized vessel shown in FIGS. 3A and 3B.

FIG. 5 illustrates one embodiment of the gate valve 220 of the valve assembly 210 in an open position to allow the inner shaft 120 to fully advance distally such that the optically transparent member 140 of the inner shaft 120 is positioned within the pressurized vessel 200. This can enable an inspection tool 300, such as a non-pressure rated borescope, to perform a visual inspection of the vessel 200 while inside of the inner shaft 120. Conversely, when the valve assembly 210 is closed, the gate valve 220 can extend across the longitudinal channel so as to preclude distal advancement of the inner shaft 120. When the inspection is completed, the above-described steps can be performed in reverse so as to decouple the insertion tool 100 from the valve assembly 210, without having to depressurize the high-pressure vessel 200.

In some embodiments, the construction of the inner shaft 120 can vary from that which is illustrated in FIGS. 1-8. For instance, the inner shaft 120 can include multiple sliding shafts or "stages," enabling the inner shaft 120 to telescope distally (i.e., toward the vessel 200) without the entirety of the inner shaft 120 sliding distally. A telescoping inner shaft, as described below, can provide for greater extension of the inner shaft while minimizing the length thereof in a retracted position.

Figure 9B:
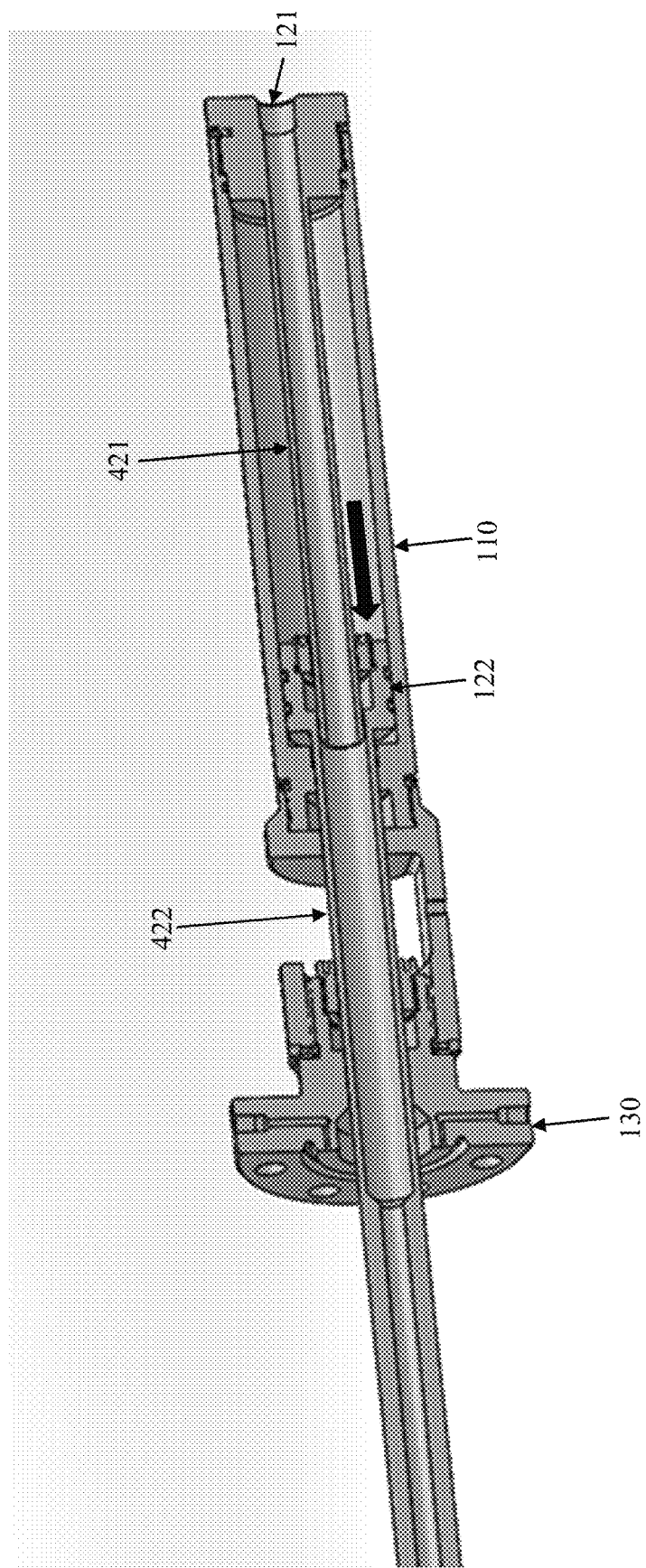

In detail, FIGS. 9A and 9B illustrate one embodiment of a telescoping inner shaft 420 for use in the insertion tool 100. FIG. 9A shows the inner shaft 420 in a retracted position, and FIG. 9B shows the inner shaft 420 in an extended position. As shown, the inner shaft 420 can include multiple concentrically-shaped shafts, such as inner shaft member 421 and outer shaft member 422. The optically transparent member 140 can be disposed at a distal portion of the outer shaft member 422.

In some embodiments, the outer diameter of the outer shaft member 422 can be greater than that of the inner shaft member 421. Thus, in the retracted position, the inner shaft member 421 can be positioned inside of a portion of the outer shaft member 422. In other embodiments, the outer diameter of the outer shaft member 422 can be less than that of the inner shaft member 421, such that the outer shaft member 422 can be positioned inside of a portion of the inner shaft member 421 in the retracted position. In the extended position, an inspection tool 300 can be inserted in the opening 121 of the inner shaft 420 and distally translated through the interior of the telescoped inner shaft 420 in a manner similar to that which has been described above.

The inner shaft member 421 can be fixedly mounted to a proximal portion of the housing 110. In some cases, the inner shaft member 421 can be mounted to an inner surface of the housing 110. As such, the inner shaft member 421 can remain fixed while the outer shaft member 422 extends distally toward the pressurized vessel 200. Thus, in contrast with the inner shaft 120 described hereinabove, it can be unnecessary for the inner shaft 420 in its entirety to translate distally in order to advance the optically transparent member 140 to the vessel 200.

The outer shaft member 422 can slide distally, away from the position at which the inner shaft member 421 is mounted to the housing 110, in a manner similar to the movement of the inner shaft 120 as described above. For example, the outer shaft member 422 can include a piston 122 coupled thereto, forming a seal with the inner wall of the housing 110. The piston 122 can be mechanically driven (e.g., using an assembly of gears or the like) to allow for translating the outer shaft member 422 distally (toward the pressurized vessel 200) or proximally (away from the vessel 200), or, alternatively, the piston 122 may be pneumatically, hydraulically, or electrically driven. In some cases, the sealed chamber 111 can contain hydraulic fluid to assist in slidable movement of the outer shaft member 422. Additionally, or alternatively, the outer shaft member 422 can be advanced or retracted manually.

An additional seal 423 (e.g., an annular gasket, or the like) can be disposed between the inner shaft member 421 and the outer shaft member 422 to prevent a leakage of pressure therebetween. As shown in FIG. 9B, the seal 423 can translate in conjunction with the outer shaft member 422, thus maintaining the seal between the inner shaft member 421 and the outer shaft member 422 during telescoping.

As shown in FIGS. 9A and 9B, the inner diameter of the outer shaft member 422 can change at a mid-point thereof. For example, the inner diameter of a proximal portion of the outer shaft member 422, in which the inner shaft member 421 is disposed in the retracted position, can be larger than the inner diameter of a distal portion of the outer shaft member 422. In such case, the distal portion of the outer shaft member 422 can be formed such that the inner diameter thereof prevents proximal movement of the outer shaft member 422. That is, the inner diameter of the distal portion of the outer shaft member 422 can be less than the outer diameter of the inner shaft member 421, prevent proximal movement of the outer shaft member 422 upon the inner shaft member 421 abutting a surface of the distal portion of the outer shaft member 422.

It is to be understood that the telescoping inner shaft, as described above, can include any number of sliding shaft members or "stages" in accordance with the desired reach and retracted length of the inner shaft.

Figure 10A:
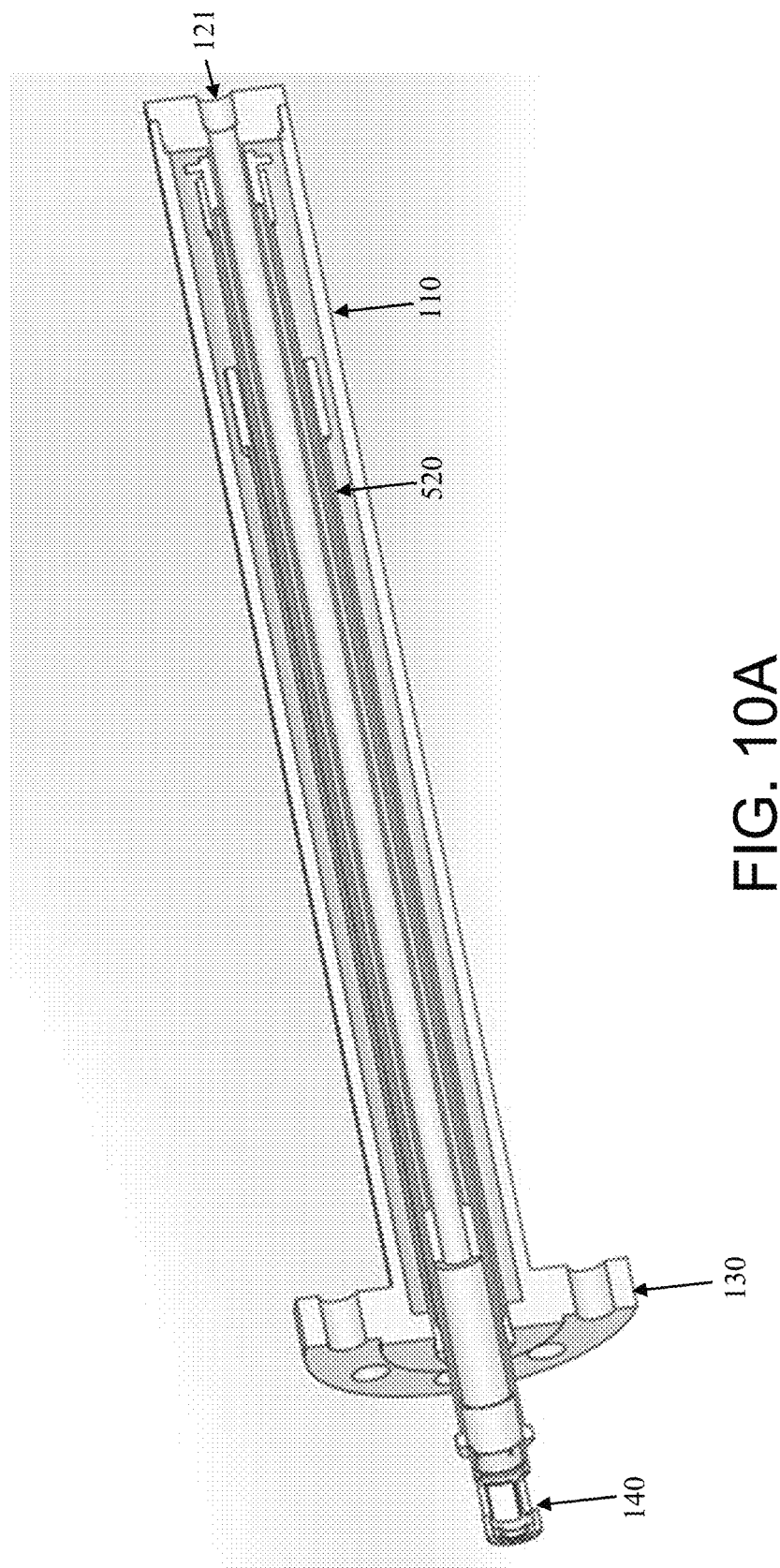
FIGS. 10A and 10B include cross-sectional side views of a telescoping inner shaft, according to a second embodiment, for use in the insertion tool of FIG. 1.
Figure 10B:
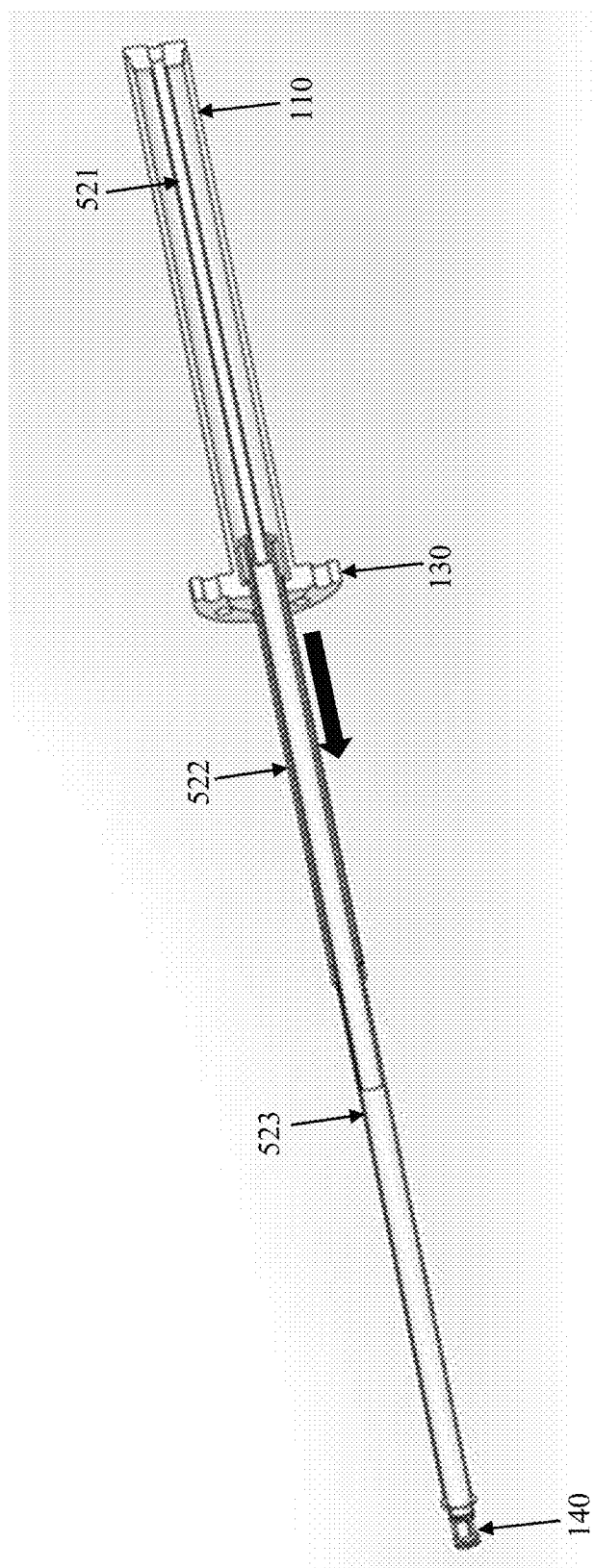

For example, FIGS. 10A and 10B illustrate another embodiment of a telescoping inner shaft 520 for use in the insertion tool 100. FIG. 10A shows the inner shaft 520 in a retracted position, and FIG. 10B shows the inner shaft 520 in an extended position. As shown, the inner shaft 520 can include multiple concentrically-shaped shafts, such as inner shaft member 521, outer shaft member 522, and distal shaft member 523. The optically transparent member 140 can be disposed at a distal portion of the distal shaft member 523.

In some embodiments, the outer diameter of the outer shaft member 522 can be greater than that of the inner shaft member 521. Thus, in the retracted position, the inner shaft member 521 can be positioned inside of a portion of the outer shaft member 522. Moreover, the distal shaft member 523 can be formed so as to fit inside of the outer shaft member 523 in the retracted position. Alternatively, the distal shaft member 523 can have an outer diameter greater than that of the inner shaft member 521 and the outer shaft member 522, respectively, such that the inner shaft member 521 and the outer shaft member 522 are positioned inside of the distal shaft member 523 in the retracted position. In the extended position, an inspection tool 300 can be inserted in the opening 121 of the inner shaft 520 and distally translated through the interior of the telescoped inner shaft 520 in a manner similar to that which has been described above.

Operationally, the telescoping inner shaft 520 can function in a manner similar to the telescoping inner shaft 420 as described above. For instance, the inner shaft member 521 can be fixedly mounted to a proximal portion of the housing 110. In some cases, the inner shaft member 521 can be mounted to an inner surface of the housing 110. As such, the inner shaft member 521 can remain fixed while the outer shaft member 522 and distal shaft member 523 extend distally toward the pressurized vessel 200. Thus, in contrast with the inner shaft 120 described hereinabove, it can be unnecessary for the inner shaft 520 in its entirety to translate distally in order to advance the optically transparent member 140 to the vessel 200.

Other structural aspects of the telescoping inner shaft 520 can correspond to those of the inner shaft 420.

Accordingly, the insertion tool as discussed herein can allow for visual inspections of a high-pressure or pressurized vessel without having to depressurize, and then re-pressurize, the vessel, thus saving time and effort as compared to conventional techniques. The insertion tool can further allow for use of standard, i.e., non-pressure-rated, inspection tools during a visual inspection of the vessel, as the interior of the sealed inner shaft may exist at atmospheric pressure levels, despite being positioned within the pressurized vessel where, typically, only pressure-rated inspection tools can be operated. The non-pressurized area inside the inner shaft can also enable use of measuring instruments for the purpose of performing measurements within the pressurized vessel.

While there have been shown and described illustrative embodiments that provide for an insertion tool for inspection of a pressurized vessel, it is to be understood that various other adaptations and modifications may be made within the spirit and scope of the embodiments herein. For example, the embodiments have been primarily shown and described herein with relation to pressurized or high-pressure vessels. However, the embodiments in their broader sense are not as limited. Rather, the devices and techniques described herein may be applied to non-pressurized vessels, as well. Similarly, it should be understood that the valve assembly may be variously designed, and the design of the valve assembly as illustrated throughout the figures is provided merely for demonstration purposes. Thus, the embodiments may be modified in any suitable manner in accordance with the scope of the present claims.

It should be understood that terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "includes," or variations thereof, when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The foregoing description has been directed to embodiments of the present disclosure. It will be apparent, however, that other variations and modifications may be made to the described embodiments, with the attainment of some or all of their advantages. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. An insertion tool, comprising:
    a housing having proximal and distal ends with a sealed chamber therebetween, the distal end having a flange configured to engage with a flange of a valve assembly coupled to a pressurized vessel to allow the sealed chamber to fluidly communicate with the pressurized vessel;
    a hollow inner shaft slidably disposed through a proximal opening in the proximal end of the housing, through the sealed chamber, and through a distal opening in the distal end of the housing such that, when the insertion tool is coupled to the pressurized vessel, the inner shaft is operable to be advanced distally into the valve assembly toward an interior portion of the pressurized vessel, the inner shaft having a distal end and an inner lumen that is sealed from the sealed chamber, the inner lumen configured to receive an inspection tool therein; and
    an optically transparent member directly coupled to the distal end of the inner shaft, a portion of the optically transparent member being optically transparent to allow viewing therethrough by the inspection tool, wherein the optically transparent member includes an optically transparent member housing welded to the distal end of the inner shaft, the optically transparent member housing including a plurality of optically transparent window portions rated for high-pressure environments, the plurality of optically transparent window portions welded to the distal end of the inner shaft and disposed circumferentially around the optically transparent member housing and on a distal-facing end of the optically transparent member housing, the optically transparent member housing further including a cylindrical glass portion mounted within the optically transparent member housing.

2. The insertion tool of claim 1, wherein the inner shaft is configured to translate between a retracted position, in which the inner shaft is proximally positioned with respect to the housing, and an extended position, in which the inner shaft is distally positioned with respect to the housing.

3. The insertion tool of claim 2, wherein, when the insertion tool is coupled to the pressurized vessel, the optically transparent member is configured to be positioned outside of the pressurized vessel when the inner shaft is in the retracted position, and the optically transparent member is configured to be positioned inside at least a portion of the pressurized vessel when the inner shaft is in the extended position.

4. The insertion tool of claim 1, wherein a length of the inner shaft is greater than a length of the housing.

5. The insertion tool of claim 1, wherein the inner lumen of the inner shaft is depressurized so as to accept therein inspection tools rated for depressurized environments.

6. The insertion tool of claim 1, wherein the inner shaft is configured to have a pressure level therein that is different than a pressure level inside of the pressurized vessel.

7. The insertion tool of claim 1, wherein, when the inspection tool is inserted into the inner shaft, and the inner shaft is advanced distally into the valve assembly toward the interior portion of the pressurized vessel, the cylindrical glass portion mounted within the optically transparent member housing is configured to enable an image acquisition means of the inspection tool to acquire an image of the interior portion of the pressurized vessel though the cylindrical glass portion.

8. The insertion tool of claim 1, wherein the cylindrical glass portion is disposed in the optically transparent member housing so as to allow for a 360-degree field of view during inspection of the interior portion of the pressurized vessel.

9. The insertion tool of claim 1, further comprising a piston coupled to the inner shaft, the piston configured to drive the inner shaft distally or proximally.

10. The insertion tool of claim 9, wherein the piston is disposed on an outer circumference of the inner shaft so as to form a seal with an inner wall of the housing.

11. The insertion tool of claim 1, wherein the inner shaft is configured to be driven distally or proximally pneumatically, hydraulically, or electrically.

12. The insertion tool of claim 1, wherein the inner shaft includes one or more concentric telescoping inner shaft members.

13. The insertion tool of claim 12, wherein the inner shaft is proximally mounted to the housing, and when the insertion tool is coupled to the pressurized vessel, the one or more telescoping inner shaft members are configured to extend distally toward the interior portion of the pressurized vessel.

14. The insertion tool of claim 13, wherein the one or more telescoping inner shaft members are configured to extend distally toward the interior portion of the pressurized vessel while the inner shaft remains in a fixed position.

15. The insertion tool of claim 12, wherein the inner shaft includes an inner shaft member proximally mounted to the housing and an outer shaft member configured to extend distally toward the interior portion of the pressurized vessel when the insertion tool is coupled to the pressurized vessel, an outer diameter of the outer shaft member being greater than an outer diameter of the inner shaft member.

16. The insertion tool of claim 1, further comprising:
    a proximal housing seal disposed at a proximal opening of the housing; and
    a distal housing seal disposed at a distal opening of the housing.

17. The insertion tool of claim 1, further comprising an optically transparent member seal disposed at a proximal or distal end of the optically transparent member.

18. The insertion tool of claim 1, further comprising a flange gasket disposed adjacent to the flange of the housing.

19. A method of operating an insertion tool including a housing having proximal and distal ends with a sealed chamber therebetween, a hollow inner shaft slidably disposed through a proximal opening in the proximal end of the housing, through the sealed chamber, and through a distal opening in the distal end of the housing, and an optically transparent member directly coupled to a distal end of the inner shaft, wherein the optically transparent member includes an optically transparent member housing welded to the distal end of the inner shaft, the optically transparent member housing including a plurality of optically transparent window portions rated for high-pressure environments, the plurality of optically transparent window portions welded to the distal end of the inner shaft and disposed circumferentially around the optically transparent member housing and on a distal-facing end of the optically transparent member housing, the optically transparent member housing further including a cylindrical glass portion mounted within the optically transparent member housing, the inner shaft having an inner lumen that is sealed from the sealed chamber, the method comprising:

attaching a flange disposed at the distal end of the housing to a flange of a valve assembly coupled to a pressurized vessel;

opening a gate valve of the valve assembly such that the sealed chamber is in fluid communication with the pressurized vessel;

advancing distally the inner shaft through the gate valve and into the valve assembly toward an interior portion of the pressurized vessel; and receiving an inspection tool in the inner lumen of the inner shaft, wherein the cylindrical glass a portion of the optically transparent member housing is optically transparent to allows for a 360-degree field of view during inspection of the interior portion of the pressurized vessel viewing therethrough by the inspection tool.

* * * * *